(12) United States Patent
Parsels et al.

(10) Patent No.: US 9,175,613 B2
(45) Date of Patent: Nov. 3, 2015

(54) SYSTEM AND METHOD FOR SAFE VALVE ACTIVATION IN A DYNAMIC SKIP FIRING ENGINE

(71) Applicant: Tula Technology Inc., San Jose, CA (US)

(72) Inventors: John W. Parsels, San Jose, CA (US); Matthew A. Younkins, San Jose, CA (US); Shikui Kevin Chen, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 14/487,563

(22) Filed: Sep. 16, 2014

(65) Prior Publication Data

US 2015/0075458 A1    Mar. 19, 2015

Related U.S. Application Data

(60) Provisional application No. 61/879,481, filed on Sep. 18, 2013, provisional application No. 61/890,671, filed on Oct. 14, 2013, provisional application No. 61/925,157, filed on Jan. 8, 2014, provisional application No. 62/002,762, filed on May 23, 2014, provisional application No. 61/897,686, filed on Oct. 30, 2013.

(51) Int. Cl.
*F02D 17/02*    (2006.01)
*F02D 13/06*    (2006.01)
*F02D 41/00*    (2006.01)
(Continued)

(52) U.S. Cl.
CPC ............... *F02D 17/02* (2013.01); *F02D 13/06* (2013.01); *F02D 41/0087* (2013.01); *F02D 41/1498* (2013.01); *F02D 41/22* (2013.01); *F02D 2041/001* (2013.01)

(58) Field of Classification Search
CPC ... F02D 13/06; F02D 2041/001; F02D 41/22; F02D 41/1498; F02D 41/0087; F02D 17/04; F02D 17/02; F02D 13/0253
See application file for complete search history.

(56) References Cited

U.S. PATENT DOCUMENTS

| | | | |
|---|---|---|---|
| 4,434,767 A | 3/1984 | Kohama et al. |
| 4,489,695 A | 12/1984 | Kohama et al. |

(Continued)

OTHER PUBLICATIONS

International Search Report dated Dec. 22, 2014 from International Application No. PCT/US2014/055902.

(Continued)

*Primary Examiner* — Lindsay Low
*Assistant Examiner* — Jacob Amick
(74) *Attorney, Agent, or Firm* — Beyer Law Group LLP

(57) ABSTRACT

A variety of methods and devices for controlling the operation of the intake and exhaust valves in an internal combustion engine during skip fire operation are described. In various embodiments, an exhaust valve monitor or other suitable mechanism is used to detect exhaust valve actuation faults. When an exhaust valve actuation fault is detected for a particular cylinder, the corresponding intake valve is deactivated (or not activated) in circumstances when it would otherwise be activated in order to prevent the intake valve from opening into a cylinder that contains high pressure combustion gases. The described approach is particularly beneficial when skip fire operation is combined with cylinder deactivation so that air is not pumped through the cylinders during the skipped working cycles.

17 Claims, 14 Drawing Sheets

(51) Int. Cl.
*F02D 41/14* (2006.01)
*F02D 41/22* (2006.01)

(56) References Cited

U.S. PATENT DOCUMENTS

| | | | |
|---|---|---|---|
| 4,509,488 A | 4/1985 | Forster et al. | |
| 5,337,720 A | 8/1994 | Murakami et al. | |
| 5,377,631 A | 1/1995 | Schechter | |
| 5,490,486 A | 2/1996 | Diggs | |
| 5,537,963 A | 7/1996 | Hasebe et al. | |
| 5,796,261 A | 8/1998 | Golab | |
| 5,803,040 A | 9/1998 | Biesinger et al. | |
| 6,158,411 A | 12/2000 | Morikawa | |
| 6,431,154 B1 | 8/2002 | Inoue | |
| 6,439,176 B1 | 8/2002 | Payne et al. | |
| 6,584,951 B1 | 7/2003 | Patel et al. | |
| 6,615,776 B1 | 9/2003 | Von Andrian-Werburg | |
| 6,619,258 B2 | 9/2003 | McKay et al. | |
| 6,752,121 B2 | 6/2004 | Rayl et al. | |
| 6,782,865 B2 | 8/2004 | Rayl et al. | |
| 7,025,035 B1 | 4/2006 | Duty et al. | |
| 7,063,062 B2 | 6/2006 | Lewis et al. | |
| 7,086,386 B2 | 8/2006 | Doering | |
| 7,395,813 B2 | 7/2008 | Pagot | |
| 7,484,484 B2 | 2/2009 | Frincke et al. | |
| 7,490,001 B2 | 2/2009 | Izelfanane | |
| 7,503,296 B2 | 3/2009 | Rozario et al. | |
| 7,595,971 B2 | 9/2009 | Ganev et al. | |
| 7,757,657 B2 | 7/2010 | Albertson et al. | |
| 7,762,237 B2 | 7/2010 | Gibson et al. | |
| 7,819,096 B2 | 10/2010 | McConville et al. | |
| 7,854,215 B2 | 12/2010 | Rozario et al. | |
| 7,900,509 B2 | 3/2011 | Feldkamp et al. | |
| 7,921,709 B2 | 4/2011 | Doering et al. | |
| 7,930,087 B2 | 4/2011 | Gibson et al. | |
| 7,946,262 B2 | 5/2011 | Borraccia et al. | |
| 8,286,471 B2 | 10/2012 | Doering et al. | |
| 8,511,281 B2 | 8/2013 | Tripathi et al. | |
| 8,550,055 B2 | 10/2013 | Ferch et al. | |
| 2002/0121252 A1 | 9/2002 | Payne et al. | |
| 2005/0150561 A1 | 7/2005 | Flynn et al. | |
| 2010/0050993 A1 | 3/2010 | Zhao et al. | |
| 2010/0154738 A1 | 6/2010 | Tsukamoto et al. | |

OTHER PUBLICATIONS

Written Opinion dated Dec. 22, 2014 from International Application No. PCT/US2014/055902.

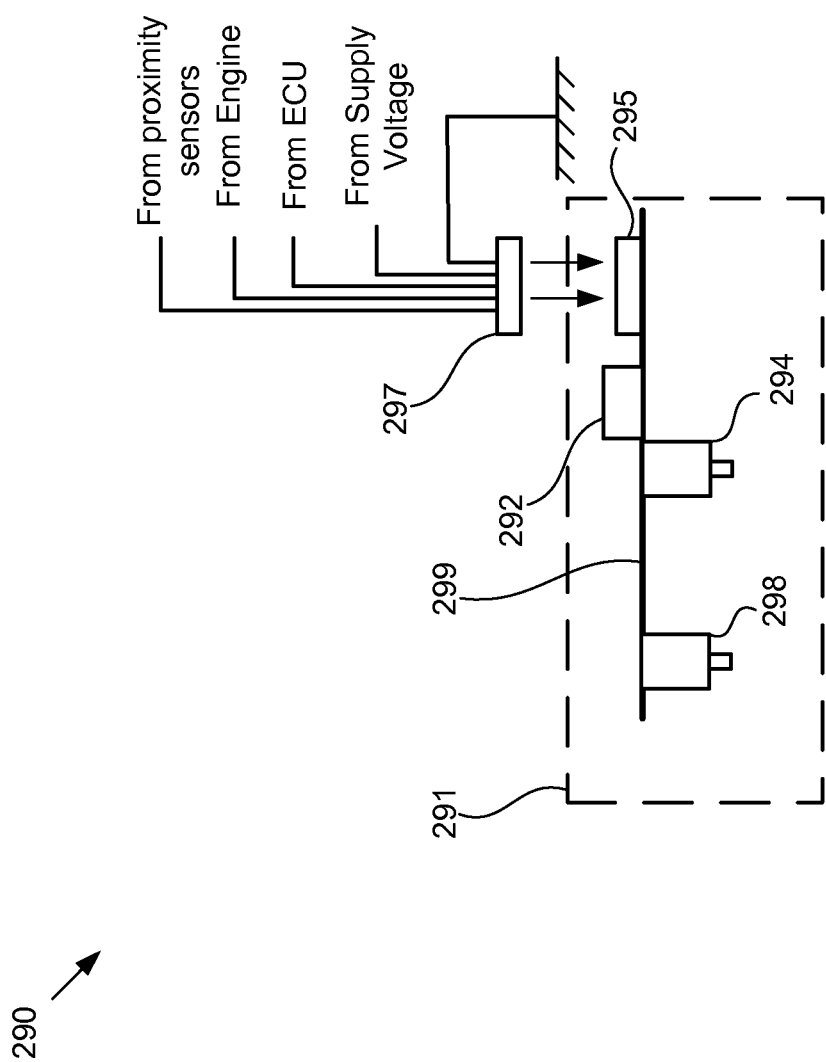

SYSTEM AND METHOD FOR SAFE VALVE ACTIVATION IN A DYNAMIC SKIP FIRING ENGINE

CROSS REFERENCE TO RELATED APPLICATIONS

This application claims priority of U.S. Provisional Patent Application No. 61/879,481, filed Sep. 18, 2013, and 61/890,671, filed Oct. 14, 2013, both of which are entitled "SYSTEM FOR INHIBITING INTAKE VALVE ACTIVATION". This application also claims priority of U.S. Provisional Patent Application No. 61/925,157, filed Jan. 8, 2014, entitled "DETERMINATION OF A HIGH PRESSURE EXHAUST SPRING IN A CYLINDER OF AN INTERNAL COMBUSTION ENGINE"; U.S. Provisional Patent Application No. 62/002,762, filed May 23, 2014, entitled "EXHAUST VALVE FAULT DETECTION" and U.S. Provisional Patent Application No. 61/897,686 filed Oct. 30, 2013, entitled "MISFIRE DETECTION SYSTEM". Each of the foregoing applications is incorporated herein by reference.

This application also incorporates U.S. patent application Ser. No. 14/207,109 by reference.

FIELD OF THE INVENTION

The present invention relates to control of the intake and exhaust valves of an internal combustion engine using skip fire control.

BACKGROUND

Fuel efficiency of internal combustion engines can be substantially improved by varying the displacement of the engine. This allows for the full torque to be available when required, yet can significantly reduce pumping losses and improve thermal efficiency by using a smaller displacement when full torque is not required. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8 cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. In this manner, even finer control of the effective engine displacement is possible. For example, firing every third cylinder in a 4 cylinder engine would provide an effective displacement of $1/3^{rd}$ of the full engine displacement, which is a fractional displacement that is not obtainable by simply deactivating a set of cylinders. U.S. Pat. No. 8,131,445 (which was filed by the assignee of the present application and is incorporated herein by reference in its entirety for all purposes) teaches a variety of skip fire engine control implementations.

SUMMARY

A variety of methods and devices for controlling the operation of the intake and exhaust valves in an internal combustion engine during skip fire operation are described. In various embodiments, an exhaust valve monitor or other suitable mechanism is used to detect exhaust valve actuation faults. When an exhaust valve actuation fault is detected for a particular cylinder, the corresponding intake valve is deactivated (or not activated) in circumstances when it would otherwise be activated in order to prevent the intake valve from opening into a cylinder that contains high pressure combustion gases. The described approach is particularly beneficial when skip fire operation is combined with cylinder deactivation so that air is not pumped through the cylinders during the skipped working cycles.

Exhaust valve actuation failures may be detected based on a variety of different parameters. In some embodiments, the failure is detected based on an analysis the rotational speed of the crankshaft or a time based derivative thereof, such as angular acceleration or angular jerk of the crankshaft. In other embodiments, the exhaust valve actuation failure may be detected based on an analysis of the output of a proximity sensor that senses movement of the exhaust valve. In still other embodiments, a variety of other inputs and/or multiple different inputs may be used to infer an exhaust valve actuation failure. In some situation, the working cycle of most concern may be the immediate next working cycle after an exhaust valve actuation failure, while in others the next following and/or subsequent working cycles may be of greater or of significant concern.

A variety of valve control systems are described that are suitable for implementing the described valve control schemes. In some embodiments, each deactivatable valve may have an associated lost motion device arranged to facilitate deactivation of the valve. By way of example, the lost motion device may take the form of a hydraulically actuation collapsible lifter. In one specific a single solenoid may be used to activate and deactivate both an intake valve collapsible lifter and an exhaust valve collapsible lifter.

BRIEF DESCRIPTION OF THE DRAWINGS

The invention and the advantages thereof, may best be understood by reference to the following description taken in conjunction with the accompanying drawings in which:

FIG. 2C is a schematic diagram of a safety circuit incorporated into an assembly with both an intake valve solenoid and an exhaust valve solenoid according to an embodiment.

In the drawings, like reference numerals are sometimes used to designate like structural elements. It should also be appreciated that the depictions in the figures are diagrammatic and not to scale.

DETAILED DESCRIPTION

Figure 1A:
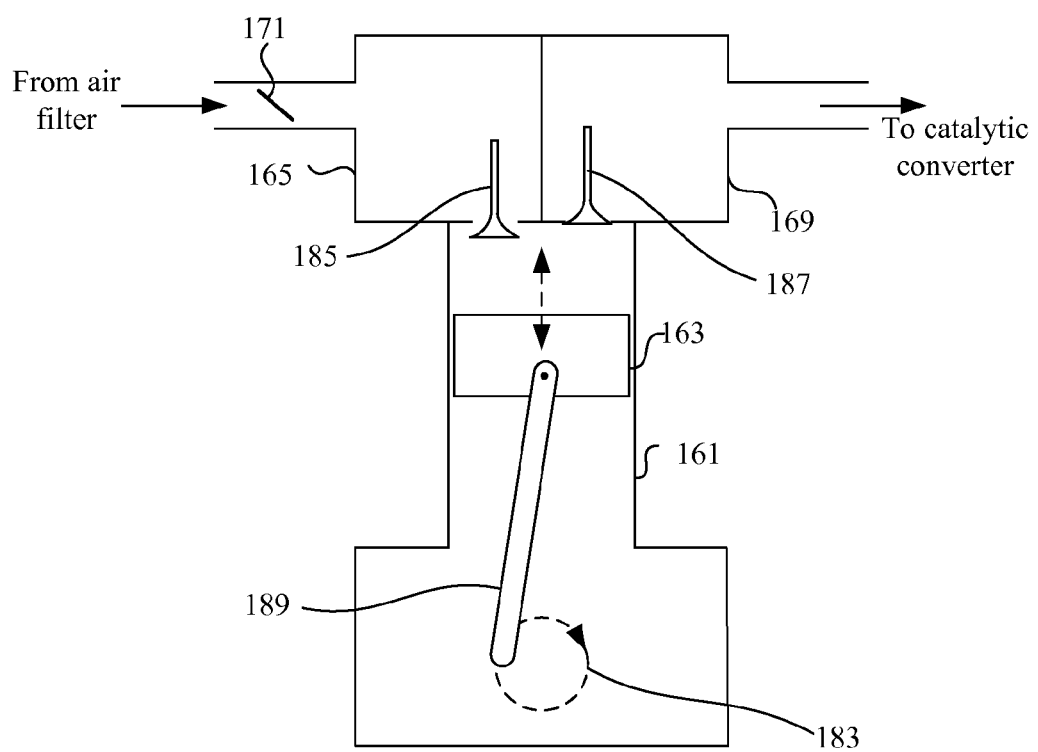
FIG. 1A is a schematic example diagram showing a portion of an engine system.

When operating with skip fire control it is generally desirable to control the intake and exhaust valves in a more complex manner than if the cylinders are always activated. Specifically, in various applications the intake and/or exhaust valves may remain closed during a skipped working cycle to minimize pumping losses. This contrasts with an engine operating on all cylinders where the intake and exhaust valves open and close on every working cycle. For cam operated valves a method to deactivate a valve is to incorporate a solenoid controlling a collapsible valve lifter into the valve train. To activate the valve the lifter remains at its full extension and to deactivate the valve the lifter is collapsed.

A potential problem with this type of control is that if for some reason the combustion gases associated with a cylinder firing have not been vented from the cylinder attempting to open the intake valve may damage the valve or push rod because of the high pressure contained in the cylinder. It is desirable if a control method and apparatus can be devised to prevent inadvertent opening of the intake valve in these situations.

The present invention relates generally to methods and devices for controlling the operation of intake and exhaust valves of an internal combustion engine during skip fire operation. In various embodiments, the valves are controlled using an eccentric cam to open and close the valves. A collapsible valve lifter is incorporated in the valve train to allow deactivation of the valves during a skipped firing cycle. The collapsible lifter is controlled using a solenoid. The solenoid allows introduction of a working fluid (such as motor oil) into the collapsible lifter to either force the lifter to remain in its fully extended (fixed state) position or allow the lifter to collapse (compressible state), leaving the valve in a closed position. An oil galley including a plurality of oil passageways may be used to deliver the pressurized oil from the solenoid to the collapsible lifter. In many cases the working fluid shifts the position of a locking pin in the collapsible lifter to shift the collapsible lifter between its fixed and compressible state. Pressurized oil applied to the pin allows compression of the collapsible lifter resulting in deactivation of the valve. That is the valve will remain closed as long as pressurized fluid is applied to the collapsible lifter associated with the valve. In order to shift the locking pin position the valve must be in its closed state. Once the valve has started to move from its closed position, i.e. starting to move off the base circle of the cam, the valve spring is applying enough force to the locking pin so that it cannot move out of place even if full oil pressure is applied. Oil pressure depends on engine rotation speed (rpm, revolutions per minute) and may be limited by a pressure relief valve set typically at 3-4 barG. While the above description involves using collapsible lifters to enable cylinder deactivation, other methods may also be used. Collapsible lifters are one form of a general class of lost motion systems where cam rotation does not result in valve motion. Additionally, a camless system may be used to move the valves. The valve motion may be accomplished by electro-magnetic, hydraulic, or pneumatic means. Any of these valve motion systems may be used with the present invention.

For a valve control system using a solenoid and collapsible lifter the time needed to deactivate the intake valve or exhaust valve is comprised of four components:
1. The time needed to create enough electrical current to start moving the solenoid valve into an opening position
2. The time to fully open the solenoid
3. The time to fill the oil galley with pressurized oil
4. The time to apply enough pressure to the lock pin and move it into an unlocked position.

The time associated with all these steps can vary depending on the oil pressure and supply voltage available to drive the solenoid. While the time may vary, 10 ms is a representative activation time $\square$act, for existing valve deactivation systems. The time necessary to deactivate the solenoid and thus activate the valve is comparable to or somewhat less than the activation time $\square$act. Note that the valve timing in degrees of crankshaft rotation often changes as a function of engine speed. Higher engine speeds result in more crankshaft rotation for a fixed time period. Generally, the time associated with all these activation steps and their variability is considered when controlling valve activation. In general it is desirable to minimize the activation time consistent with other system constraints, such as cost. Short activation times allow for a rapid system response, which is particularly important when operating at high engine speeds.

In general, skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. The fire/skip decision may be made on a firing opportunity by firing opportunity basis. This decision is typically made some number of firing opportunities prior to the firing event to allow the control system time to correctly configure the engine for either a skip or fire event. Skip fire control contrasts with conventional variable displacement engine operation in which a fixed set of the cylinders are deactivated during certain low-load operating conditions.

When a cylinder is deactivated in a variable displacement engine, its piston typically still reciprocates, however neither air nor fuel is delivered to the cylinder so the piston does not deliver any power from combustion during its power stroke. Since the cylinders that are "shut down" don't deliver any net power, the proportionate load on the remaining cylinders is increased, thereby allowing the remaining cylinders to operate at an improved thermodynamic efficiency. With skip fire control, cylinders are also preferably deactivated during skipped working cycles in the sense that air is not pumped through the cylinder and no fuel is delivered during skipped working cycles. This requires a valve deactivation mechanism where the intake and exhaust valves of a cylinder remain closed during a working cycle. In this case, no air is inducted to the deactivated cylinders during the skipped working cycles thereby reducing pumping losses.

In a deactivated cycle the intake valve remains closed, so no air can flow from the intake manifold into the cylinder. Fuel is also disabled so that no fuel is supplied to the deactivated cylinder. This is particularly important in a direct injection engine where fuel is injected directly into the cylinder. In direct injection engines uncombusted liquid fluid in the cylinder can result in hydrolock permanently damaging the engine. The exhaust valve can also remain closed in a deactivated cylinder; however, if it is closed its closing timing relative to the intake valve closing is important. If the exhaust valve remains closed after a combustion event, high pressure combustion gases are trapped in the cylinder forming a high pressure spring. This may be acceptable so long as the intake valve remains closed. If the exhaust valve is opened subsequent to the combustion event and then closed, combustion gases are vented and the gas remaining in the cylinder is at low pressure, forming a low pressure spring. If the combustion gases remain trapped in the cylinder, the intake valve or its associated mechanical mechanisms may be damaged by trying to open against the high pressure of the trapped combustion gases. Safe intake valve opening can only occur when the cylinder pressure is low, which is ensured if the cylinder has been vented through the exhaust valve prior to the intake. The embodiments below describe systems and methods for controlling of the intake and exhaust valves to avoid activation of the intake valve against a high pressure spring.

FIG. 1A illustrates an example internal combustion engine that includes a cylinder 161, a piston 163, an intake manifold 165 and an exhaust manifold 169. Air is inducted into cylinder 161 through an intake valve 185. Combustion gases are vented from cylinder 161 through an exhaust valve 187. The throttle valve 171 controls the inflow of air from an air filter or other air source into the intake manifold. Expanding gases from combustion increase the pressure in the cylinder and drive the piston down. Reciprocal linear motion of the piston is converted into rotational motion by a connecting rod 189, which is connected to a crankshaft 183. A 4-stroke engine takes two crank shaft revolutions, 720 degrees, to complete a working cycle.

Figure 1B:
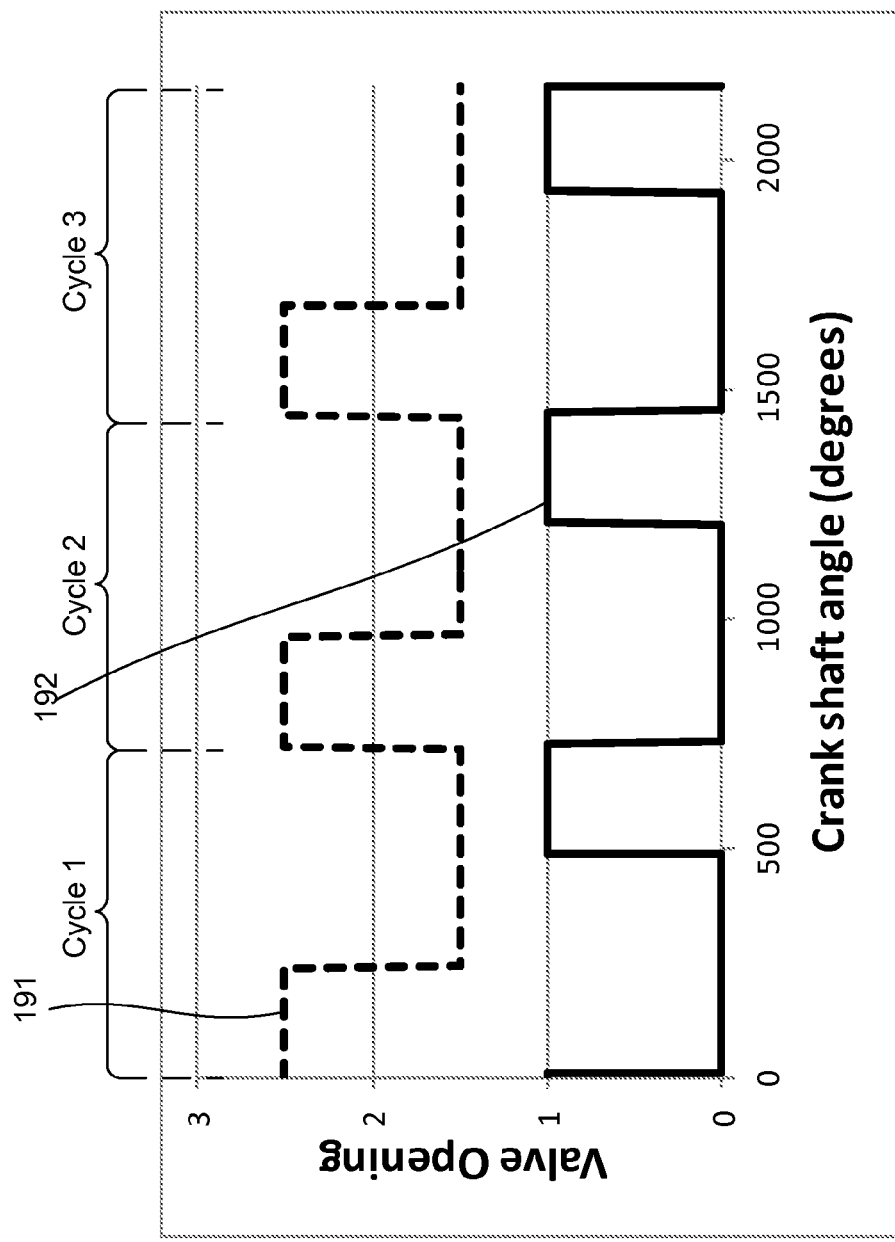
FIG. 1B is an exemplary timing diagram showing the opening and closing of an intake and exhaust valve.

FIG. 1B shows an exemplary timing diagram illustrating the opening and closing of the intake valve 191 and exhaust valve 192 associated with three cycles of an engine cylinder. In this example the cylinder is being fired in all cycles, although in skip fire operation this is not always the case. In FIG. 1B a high position corresponds to the valve being open and a low position corresponds with the valve being closed. It should be appreciated that in practice the valves open and close in an analog fashion, so that near the beginning and end of the valve open phase the valve opening is small. Also the valve acceleration/deceleration at the beginning/end of the valve opening may be small to minimize the impact of the valve on the valve seat. Because of gas dynamics the intake and exhaust valve opening dwell time is often larger than 180 degrees to maximize gas exchange into and out of the cylinder. The intake valve 191 may open for a period of approximately 240 degrees of crankshaft revolution during the intake stroke. For a 4-stroke engine after the intake stroke the cylinder then undergoes the compression and power stroke during which time both the intake and exhaust valves are closed. The exhaust valve 192 may open for a period of approximately 240 degrees of crankshaft revolution during the exhaust stroke which follows the power stroke. In practice the valve opening dwell time may vary both above and below 240 degrees. The intake valve 191 may open near or slightly before the TDC (top dead center) position of the piston. The exhaust valve 192 may close near or slightly after the TDC (top dead center) position of the piston. Thus, if the cylinder were to be fired at its next firing opportunity, the intake valve 191 may open concurrently or very soon after the closing of the exhaust valve 192 as shown in FIG. 1B. This complicates any control system that seeks to verify correct operation of the exhaust valve prior to opening the intake valve. For a four-stroke engine operating at 3000 rpm the time between firing opportunities on any given cylinder is 40 milliseconds and the intake and exhaust valves are each open for approximately 13 ms. Because of the finite response time of the controlling solenoid and collapsible lifter discussed above it is challenging to provide a control system and method that ensures proper valve operation while preventing opening the intake valve into a high pressure cylinder.

As shown in FIG. 1B opening the intake valve is substantially concurrent with or immediately follows closing the exhaust valve. For these, and other reasons, high-pressure exhaust gas trapping (deactivation prior to exhaust event) has generally been employed in various production systems that have used cylinder deactivation, such as Active Fuel Management (AFM), Displacement on Demand (DOD), Multi-Displacement System (MDS), and Variable Cylinder Management (VCM). These variable displacement engines generally are not concerned with intake valve damage from opening into a high pressure cylinder because switching a cylinder between an active and inactive state occurs only infrequently, i.e. after many engine cycles. High pressure exhaust gas, which may be initially be trapped in the cylinder, will slowly cool and leak past the piston rings so as to no longer pose a risk to opening an intake valve.

Figure 1C:
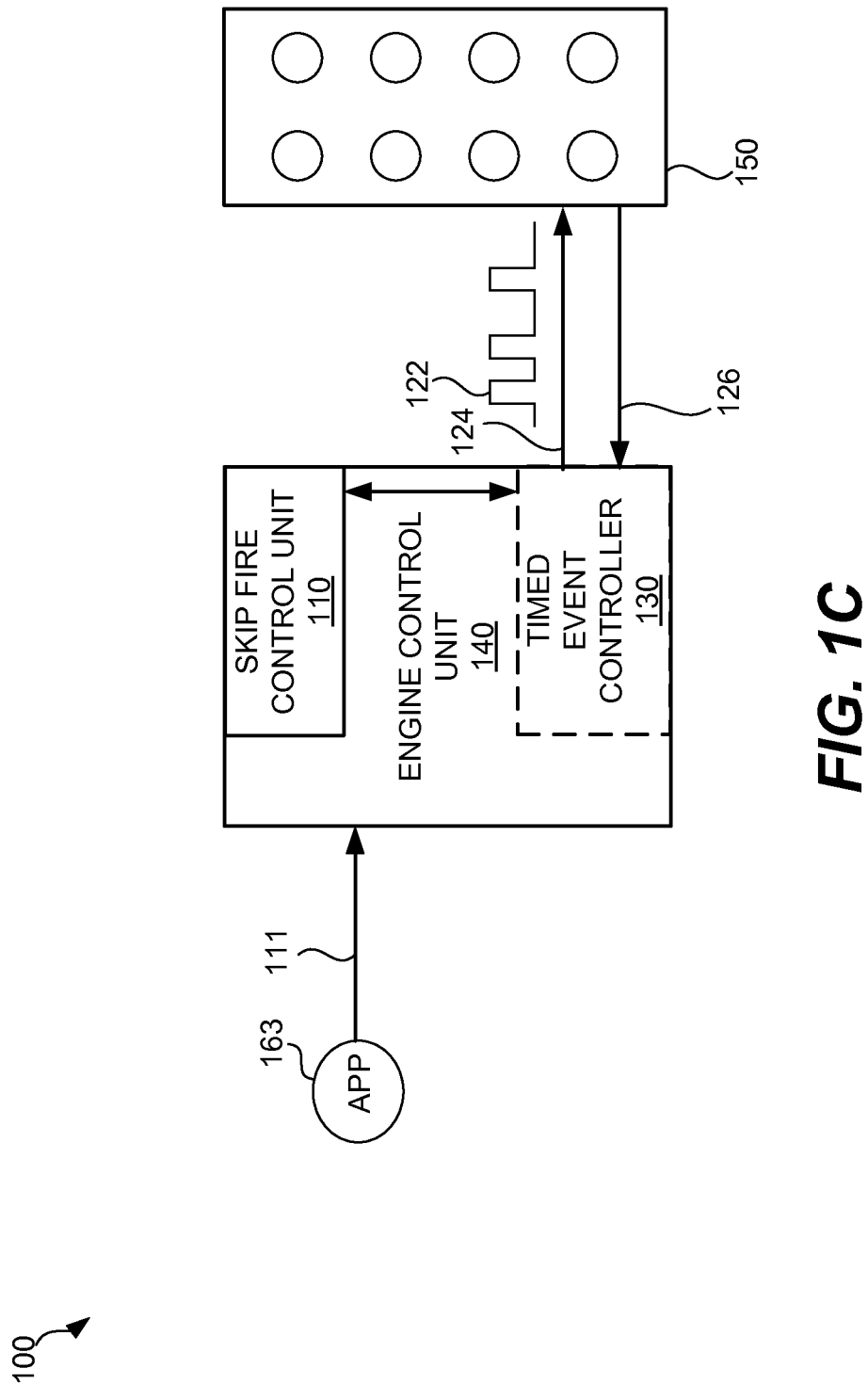
FIG. 1C is a schematic example diagram showing an engine control system.

Referring next to FIG. 1C, an engine system with a skip fire engine controller will be described. The engine system 100 includes a skip fire controller 110 incorporated into an engine control unit (ECU) 140. The ECU may also be called an Engine Control Module (ECM). In other embodiments, the functionality of the skip fire control unit 110 may be separated from the ECU 140. The ECU 140 receives an input signal 111 indicative of a desired engine output. The signal 111 may be received or derived from an accelerator pedal position sensor (APP) 163 or other suitable sources, such as a cruise controller, a torque calculator, etc. The skip fire control unit 110 is arranged to generate a sequence of firing commands 122 that is directed along signal line 124 to cause an engine 150 to provide the desired output using a skip fire approach. While the engine 150 is depicted as having 8 cylinders, the invention is applicable to an engine having any number of cylinders. The ECU 140 and/or skip fire control unit 110 may contain one or more timed event controller 130. The time event controller 130 can handle various time critical processing tasks without engaging the entire ECU 140 or skip fire control unit 110. The timed event controllers 130 may be programmed to operate approximately 540 degrees of crankshaft rotation in advance of the start of the timed event. The timed event may correspond to the start of a working cycle, which may approximately match the intake valve opening. There may be multiple timed event controllers in the ECU; for example one timed event controller may control the intake valve and another timed event controller can control the exhaust valve. The engine 150 may communicate information regarding various status indicators to the ECU 140 along signal line 126. Information on signal line 126 may include information regarding the status of the intake and exhaust valves (not shown in FIG. 1C) associated with each cylinder in the engine. It may also include information regarding the position of the crankshaft derived from a crankshaft sensor (not shown in FIG. 1C) and the position of the camshaft derived from a camshaft sensor (not shown in FIG. 1C). While in FIG. 1C a single communication channel is indicated it should be understood that multiple communication channels going to various parts of the ECU 140 may be present.

Figure 2A:
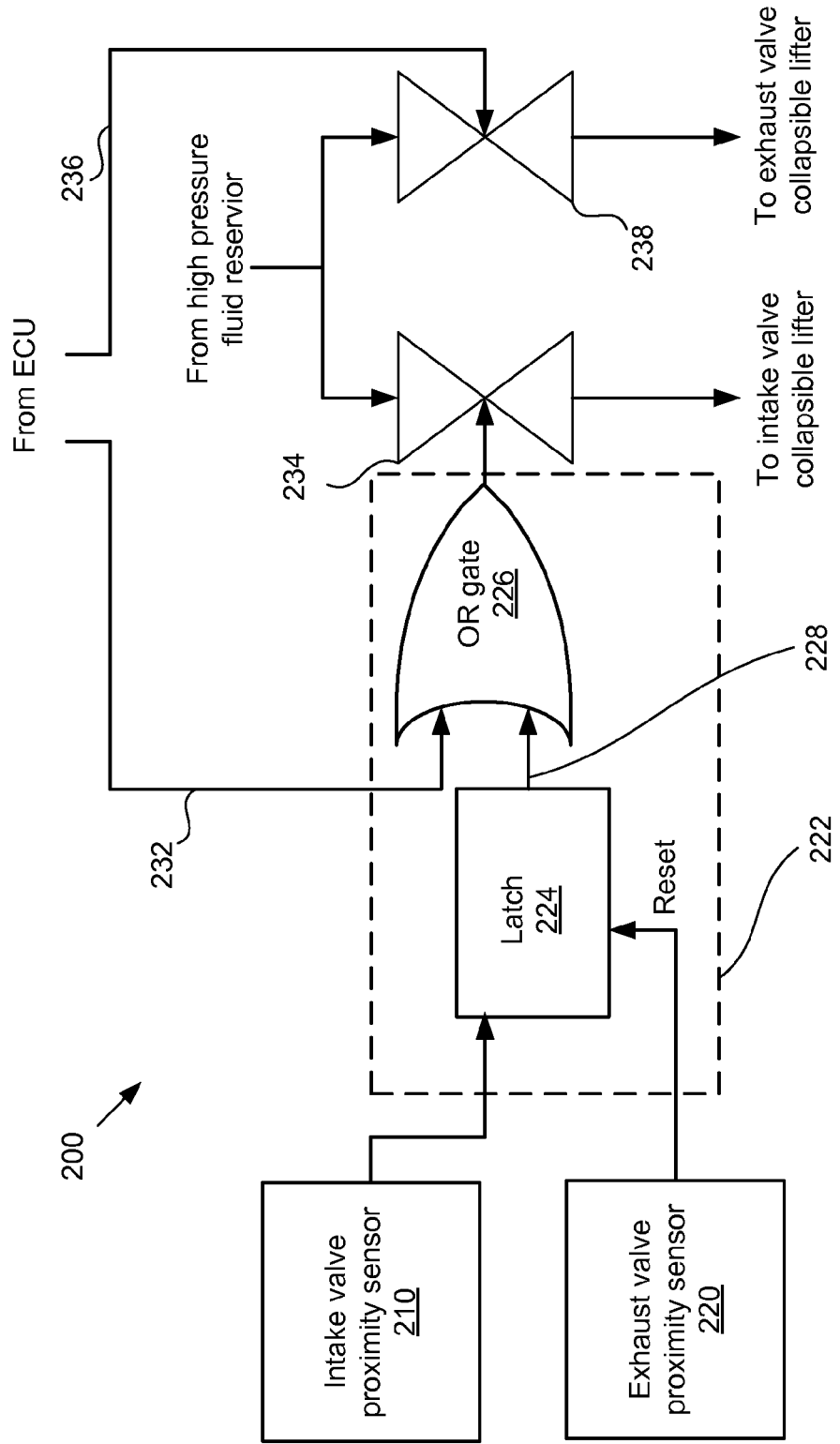
FIG. 2A is a schematic diagram of a valve control system that inhibits opening of an intake valve into a cylinder containing high pressure gas according to a first embodiment.

A first embodiment of a valve control system 200 is shown in FIG. 2A. This embodiment uses proactive control, which means that the intake valve is deactivated after each intake event and must be reactivated to initiate a subsequent intake event. The system may be implemented using proximity sensors mounted into the valve covers of an engine adjacent the valves. The engine may be of any type, such as a V-style, an in-line style, or opposing cylinder engine having any number of cylinders. The system uses two proximity sensors per cylinder, one monitoring the position of the intake valve 210 and one monitoring the position of the exhaust valve 220. The proximity sensors may detect small amounts of valve motion. For example, the proximity sensors may detect a valve lift of approximately 1.5 mm out of a total valve lift of approximately 13 mm Thus the proximity sensor may provide a signal representative of most of a valve opening dwell time.

Signals from the proximity sensors trigger a response in a safety circuit 222 that is connected to the intake valve solenoid 234. The safety circuit 222 may include a latch 224 and an OR gate 226. In operation the latch output 228 may go to a "high" state upon receiving a signal from the intake valve proximity sensor 210. The latch 224 remains in this state until it receives a reset signal from the exhaust valve proximity sensor 220 which forces it to a "low" state. The latch output 228 will remain in a low state until a signal is received from the intake valve proximity sensor 210. The latch output 228 is connected to an input of OR gate 226 as is the intake valve control line 232 coming from the ECU. If either of these two lines are "high" the intake valve solenoid 234 is activated opening the connection between the high pressure fluid reservoir and the intake valve collapsible lifter. Application of the high pressure fluid causes the collapsible lifter to become compressible, deactivating the intake valve. The safety circuit 222 thus forces the intake valve to remain deactivated until the latch 224 is cleared by a signal from the exhaust valve proximity sensor 220. If the exhaust valve has not moved, the intake valve action will be blocked by the safety circuit 222 insuring the intake valve remains deactivated and does not attempt to open against high pressure gasses in the combustion chamber until an exhaust event occurs on the deactivated cylinder. The intake valve is reactivated by a signal from the exhaust valve proximity sensor 220, which indicates the start of motion of the exhaust valve. While a particular implementation of control logic has been described above it should be understood that equivalent or similar functionality may be achieved using different logical conventions, mechanisms and/or system layouts.

The ECU also controls the opening of the exhaust valve through the exhaust valve control line 236 and the exhaust valve solenoid 238. In this embodiment knowledge of these parameters is not required for operation of the safety circuit 222. The safety circuit only requires verification of motion of the exhaust valve as measured by the exhaust valve proximity sensor 220.

The valve deactivation mechanisms may have other constraints such as a maximum safe operating engine speed, minimum oil pressure, and minimum solenoid operating voltage. As the engine speed increases the valve deactivation must occur more quickly since the time between firing opportunities decreases. Above some engine speed, such as for example 3800 rpm, it may no longer be safe to deactivate the valves and valve deactivation may be disabled. The maximum engine speed for valve deactivation may be higher or lower than this value and may vary with other engine parameters as described below. In addition, if the supply voltage is low the valve deactivation response is slowed and it may not be possible to safely deactivate the valves. Similarly, if the oil pressure is low the valve deactivation response is slowed and it may not be possible to safely deactivate the valves. Thus the safety circuit may include a maximum operating engine speed, minimum supply voltage, and a minimum operating engine oil pressure lockout (not shown in FIG. 2A). These signals, in addition to handshake signals, may be exchanged between the ECU and safety circuit to provide controlled operation and synchronization.

The lockout levels may be a function of various parameters and are not necessarily fixed levels. For example, if the oil pressure is high, providing fast response, the allowable engine speed before deactivation lockout may increase. The allowable engine operating speed range may be limited by hydraulic system design (accumulator behavior), oil aeration, oil contamination (pin friction), pin degradation concerns, oil pressure versus RPM variation due to manufacturing, and wear variation in the oil pump. All these variables may be taken into account when determining the lockout levels.

If any lockout parameter is exceeded and cylinder deactivation is disabled it is necessary to perform the system disablement in a safe and appropriate manner. One possible method is to first disconnect the supply voltage from the exhaust valve solenoids. This can be done simultaneously for all exhaust valve solenoids in the engine. After disconnecting the supply voltage, the engine is allowed to make at least two crankshaft rotations to ensure that all the cylinders have experienced an exhaust event. The supply voltage for the intake valve solenoids may then be disconnected. This ensures that an exhaust event always occurs prior to an intake event as required for safe operation and restoring conventional, all-cylinder, engine operation.

Deactivation mode may be enabled by a similar process, e.g., by reversing the above sequence of events. In this approach, the first step is activation of the supply voltage for the intake valve solenoids. The system then waits for at least 2 crankshaft revolutions before activation of the supply voltage to the exhaust valve solenoids. Hysteresis in between the deactivation enabled and disabled states may be used to avoid excessive cycling between the two states. For example, if the valve deactivation engine speed lockout level is 3800 rpm, valve deactivation may be enabled once the engine speed returns to below 3500 rpm.

An advantage of the embodiment shown in FIG. 2A is that it may operate autonomously from any valve deactivation control signals produced by the ECU. If the ECU 140 fails in its control for any reason, whether a hardware failure or software failure, the safety circuit 222 will prevent pushrod or valve damage in the engine from the intake valve attempting to open into a high pressure cylinder.

Figure 2B:
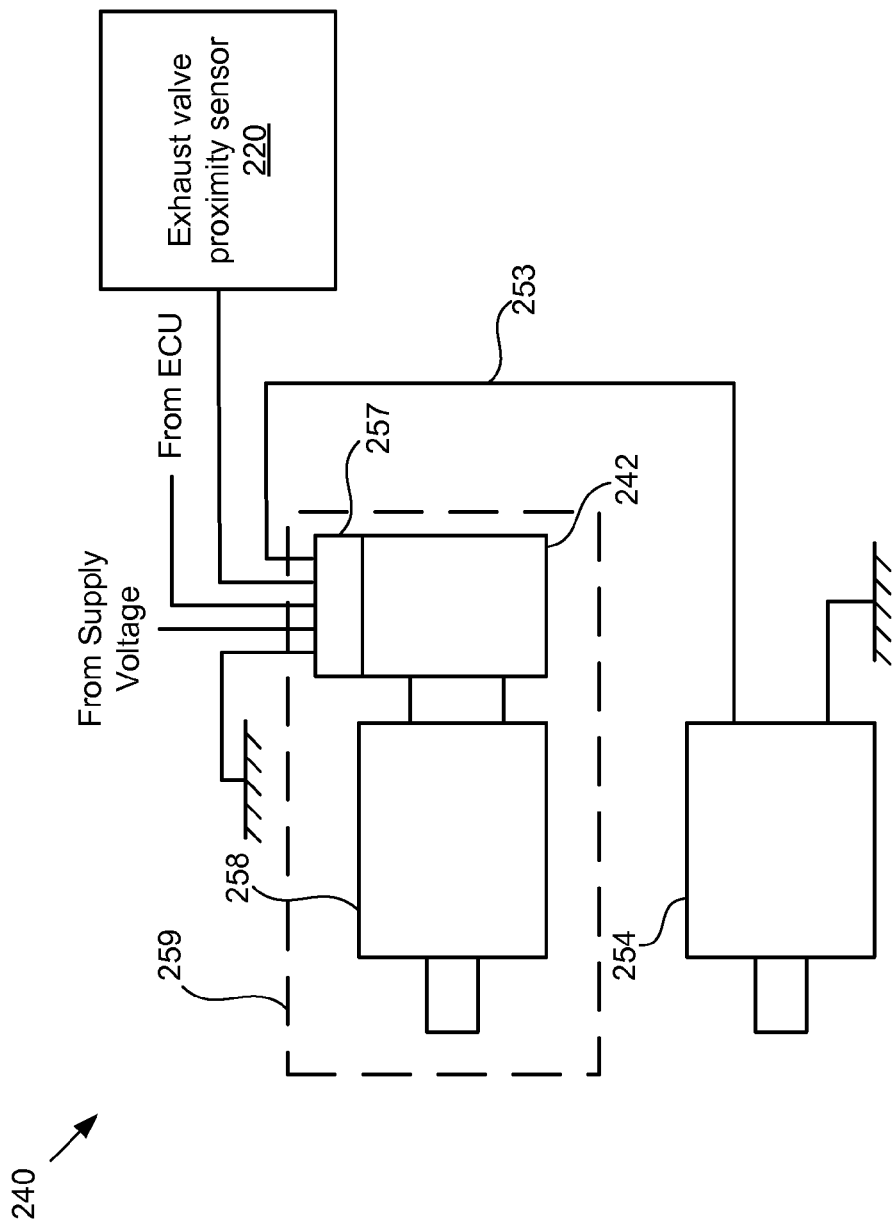
FIG. 2B is a schematic diagram of a safety circuit incorporated into an exhaust valve solenoid according to an embodiment.

The system shown in FIG. 2A may be mechanically configured in many ways. One configuration 240 is shown in FIG. 2B. A safety circuit 242 is physically situated on or adjacent to the exhaust solenoid 258 to form an exhaust solenoid assembly 259. The safety circuit may have at least three electrical inputs, a supply voltage line, a signal line from the ECU, and a signal line from the exhaust valve proximity sensor 220, at least one electrical output 253 going to the intake solenoid 254, and a ground line. The lines may be connected to the safety circuit 242 using a connector 257. The safety circuit may be mechanically integrated into either the intake solenoid 258 or the connector 257. The safety circuit 242 only allows deactivation of the intake solenoid 258 (and thus opening of the intake valve) after receiving a signal from the exhaust valve proximity sensor 220 that the exhaust valve has opened.

An alternative configuration 290 is shown in FIG. 2C where the exhaust solenoid 298 and intake solenoid 294 may be mechanically mounted together with the safety circuit 292 forming an integrated package 291 containing the components necessary to safely activate and deactivate a cylinder. The integrated package 291 may be referred to as a single cylinder solenoid assembly. The components may be mounted together on a lead frame, circuit board or some type of mechanical member 299. The lead frame may have a plurality of conductive members electrically isolated from each other and have sufficient mechanical rigidity to provide a mounting surface for all solenoids. Also mounted on the mechanical member 299 is a receptacle 295 which mates with connector 297. Connector 297 may include power and ground connections as well as signals from the valve proximity sensors, engine, and ECU.

Figure 2D:
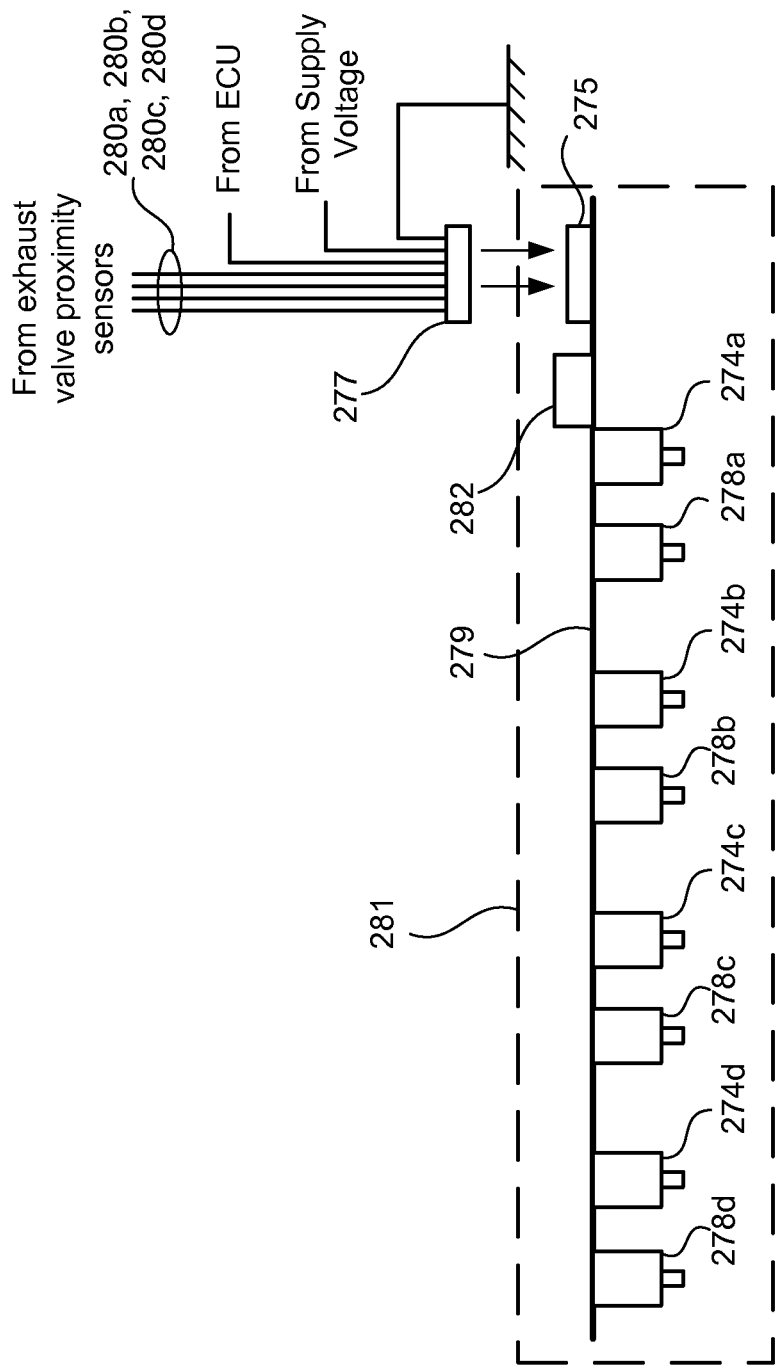
FIG. 2D is a schematic diagram of a safety circuit incorporated in an assembly with a plurality of intake and exhaust valve solenoids according to an embodiment.

For multi-cylinder engines a plurality of intake valve solenoids, exhaust valve solenoids and safety circuits may be mounted off a common mechanical structure to form a solenoid assembly 281 as shown in FIG. 2D. FIG. 2D shows four intake valve solenoids 274a, 274b, 274c, 274d and four exhaust valve solenoids 278a, 278b, 278c, 278d mounted on a common frame 279. Each pair of solenoids may control operation of a cylinder, allowing it to be activated and deactivated as directed by the ECU, i.e. solenoids 274a and 278a control cylinder "a", solenoids 274b and 278b control cylinder "b", etc. A safety circuit 282 may be mounted on the frame 279 to prevent the opening of any intake valve unless the exhaust valve on the corresponding cylinder has opened to vent combustion gases. Safety circuit functionality for all cylinders may be confined to a single module or it may be distributed at various sites along the frame 279. Verification that the respective exhaust valves have open may be obtained via signal lines 280a, 280b, 280c, and 280d that transmit signals from exhaust valve proximity sensors (not shown in FIG. 2C) associated with each cylinder. A single connector 277 may be used to provide the required control signals and electrical power to the solenoid assembly 281. The connector 277 may include signal lines 280a, 280b, 280c, and 280d as well as one or more signal lines from the ECU, a power line, and a ground line. Other lines may also be included in connector 277. The connector may plug into receptacle 275 which is mounted on frame 279. In some embodiments, solenoid assembly 281 may operate without signal lines 280a, 280b, 280c, and 280d from exhaust valve proximity sensors. In this case, the exhaust valve is assumed to have opened in response to directions from the ECU prior to opening the intake valve on the associated cylinder. In some embodiments the safety circuit 282 could be mounted on such an interface or interconnect structure inside the engine and not incorporated into solenoid assembly 281. While solenoid assembly 281 is shown with eight solenoids corresponding to four cylinders, solenoid assembly 281 may be configured to work with any number of cylinders.

All of the above mechanical configurations may incorporate additional functionality into the safety circuit or somewhere else on the assembly. For example, various aspects of cylinder control, such as the fire/skip decision, may be performed by a microprocessor in the safety circuit. This architecture would reduce the processing requirements of the ECU and the number of signal line connections between the ECU 140 and engine 150 (see FIG. 1C).

Figure 3:
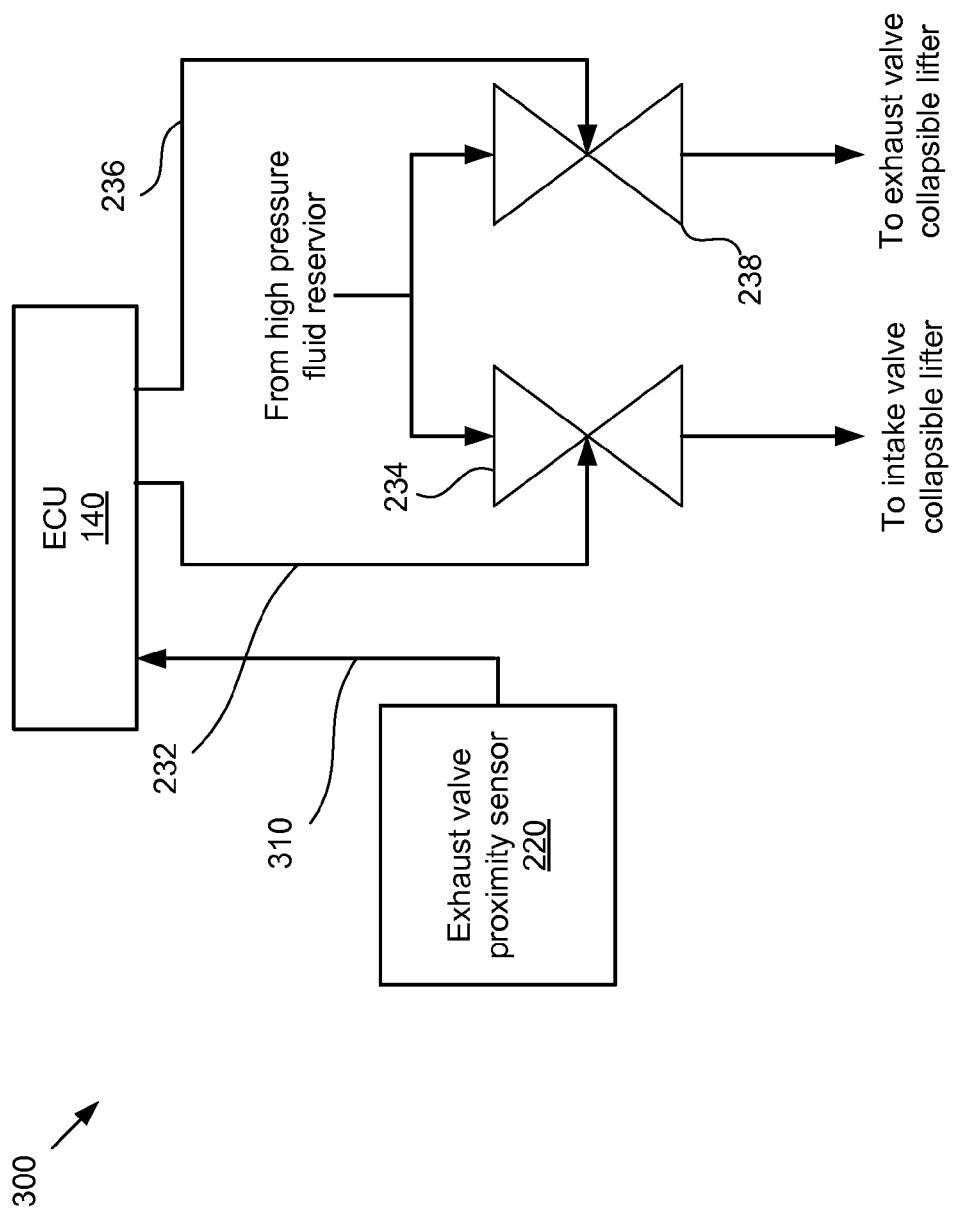
FIG. 3 is a schematic diagram of a valve control system that inhibits opening of an intake valve into a cylinder containing high pressure gas according to a particular embodiment.

Another embodiment of a valve control system 300 is shown in FIG. 3 This embodiment also uses proactive control, which means that the intake valve is deactivated after each intake event and must be reactivated to initiate a subsequent intake event. This embodiment integrates a valve action sensing and valve deactivation system into the ECU 140 for control of cylinder deactivation during skip-fire operation. This embodiment uses a proximity sensor on the exhaust valve 220 of each engine cylinder, but no proximity sensor is required on the intake valve.

The exhaust valve proximity sensor is connected to the ECU 140 by exhaust valve monitor line 310. The ECU 140 is connected to an intake valve solenoid 234 by an intake valve control line 232. The ECU 140 is connected to an exhaust valve solenoid 238 by an exhaust valve control line 236. The intake valve solenoid 232 controls the application of a working fluid from the high pressure fluid reservoir to an intake valve collapsible lifter. The exhaust valve solenoid 236 controls application of a working fluid from the high pressure fluid reservoir to an exhaust valve collapsible lifter. The ECU 140 operates on non-volatile firmware that helps provide control of the intake and exhaust valves.

The system is implemented using software control of the intake and exhaust valve control solenoids. Proximity sensor 220 is mounted so as to detect motion of the exhaust valve. Each cylinder in the engine may have an exhaust valve proximity sensor 220. Subsequent to active use of an intake valve, the intake valve control solenoid 232 is activated so as to deactivate the intake valve on the collapsible lifter's return to the base circle of the cam lobe. The intake valve remains deactivated until the ECU detects motion of the exhaust valve from the associated exhaust valve proximity sensor for that cylinder. If exhaust valve motion is not detected, intake valve action is blocked by the ECU insuring the intake valve remains deactivated and does not attempt to open against high pressure gasses in the combustion chamber until an exhaust event occurs on the deactivated cylinder.

Detection of an exhaust valve motion signal through the proximity sensor 220 triggers a response in the ECU 140 to allow reactivation of the intake valve. The intake valve may either be activated for a fire event, or left with the solenoid activated in the event of an intended skip event. The sequence is inherently safe as the ECU 140 does not allow reactivation of the intake valve unless a previous motion is detected on the exhaust valve. Solenoids generally turn off faster than they turn on. This control method leverages this feature of solenoids, since the solenoid turn off is sufficiently fast as to allow reactivation at a reasonably high engine speed. If reactivation does not occur in time for the next valve event, in various embodiments it could simply be activated on the following event. In general, occasionally missing an intake event is not a problem, since it causes no damage to the engine. Even if fuel is injected into the cylinder and not combusted due to lack of air, insufficient fuel is injected on any working cycle to cause engine damage.

In addition, valve deactivation system 300 may have a maximum safe operating engine speed, a minimum operating voltage, and a minimum operating engine oil pressure, that the ECU may consider in its calculation of timing events and whether operation in skip fire mode is appropriate.

Basically, as opposed to actively commanding deactivation of cylinders as a skip is requested, cylinders would always be deactivated after use and activated only on fire commands. This is an example of proactive control, which means that the intake valve is deactivated after each intake event and must be reactivated to initiate a subsequent intake event.

An advantage of this embodiment is that only a single proximity sensor need be used for each cylinder, to monitor the exhaust valve. A proximity sensor is not required to verify intake valve motion. This may reduce system cost when compared with systems that require two proximity sensors per cylinder.

Figure 4A:
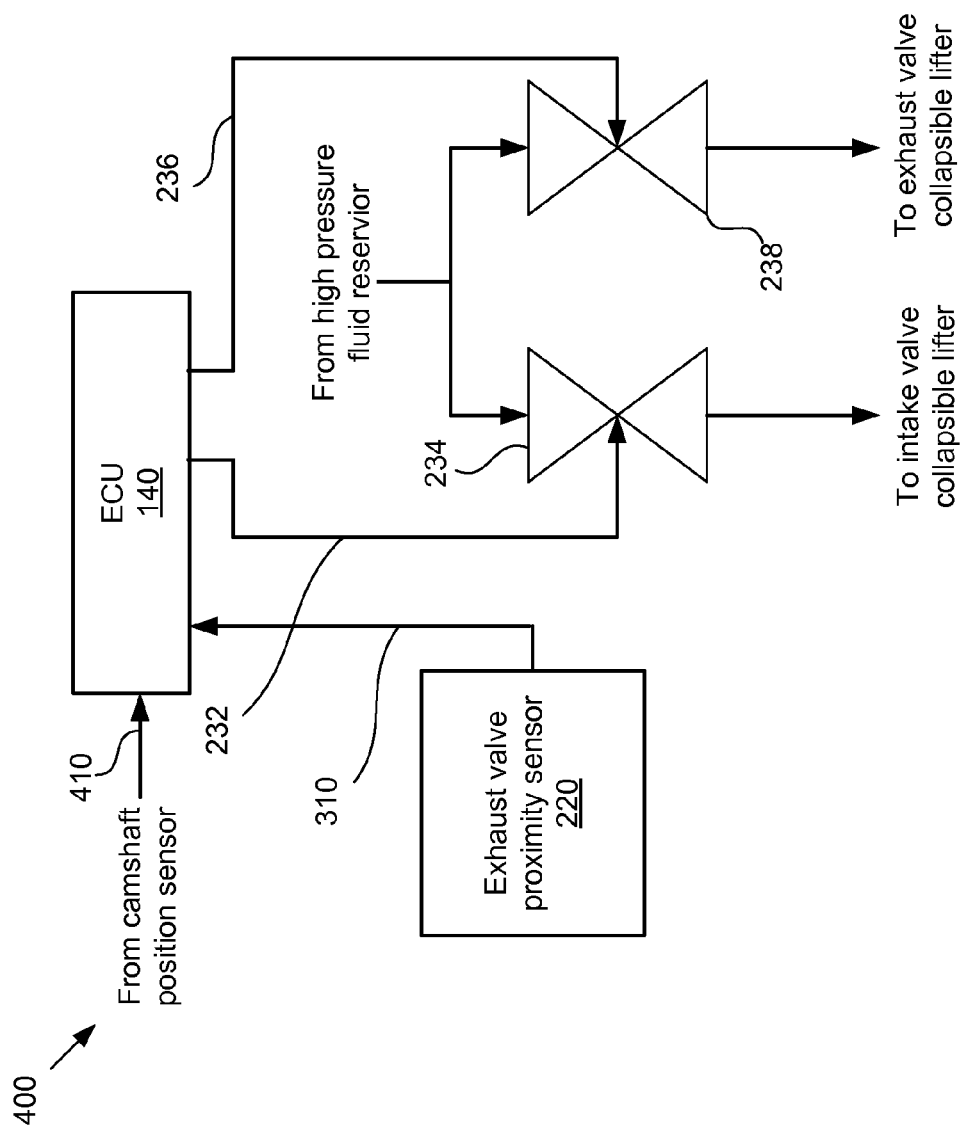
FIG. 4A is a schematic diagram of a valve control system that inhibits opening of an intake valve into a cylinder containing high pressure gas according to a particular embodiment.

Another embodiment of a valve control system 400 is shown in FIG. 4A. This embodiment uses reactive control, which means that the intake valve state may be either active or deactivated prior to an intake event. To avoid damaging the intake valve the control system verifies that an exhaust event occurred prior to the next intake event. If an exhaust event has not occurred and the intake valve is not deactivated, it is deactivated immediately to prevent damage to the intake valve, push rod, lifter, or other loss of motion mechanism. An exhaust valve proximity sensor may be used to verify operation of the exhaust valve indicating an exhaust event. Determination of the missing exhaust event can be accomplished by measurement of the cam angle and an appropriate cam angle guard band where the proximity sensor signal should have been detected.

As in the previous embodiment, the exhaust valve proximity sensor is connected to the ECU 140 by exhaust valve monitor line 310. The ECU 140 is connected to an intake valve solenoid 234 by an intake valve control line 232. The ECU 140 is connected to an exhaust valve solenoid 238 by an exhaust valve control line 236. The intake valve solenoid 232 controls the application of a working fluid from the high pressure fluid reservoir to an intake valve collapsible lifter. The exhaust valve solenoid 236 controls the application of a working fluid from the high pressure fluid reservoir to an exhaust valve collapsible lifter. A difference between this embodiment and the previous embodiment is that a camshaft position signal 410 is input into the ECU 140. This signal is required for failsafe operation of the intake valve using either hardware, firmware, or software present in the ECU 140.

Figure 4B:
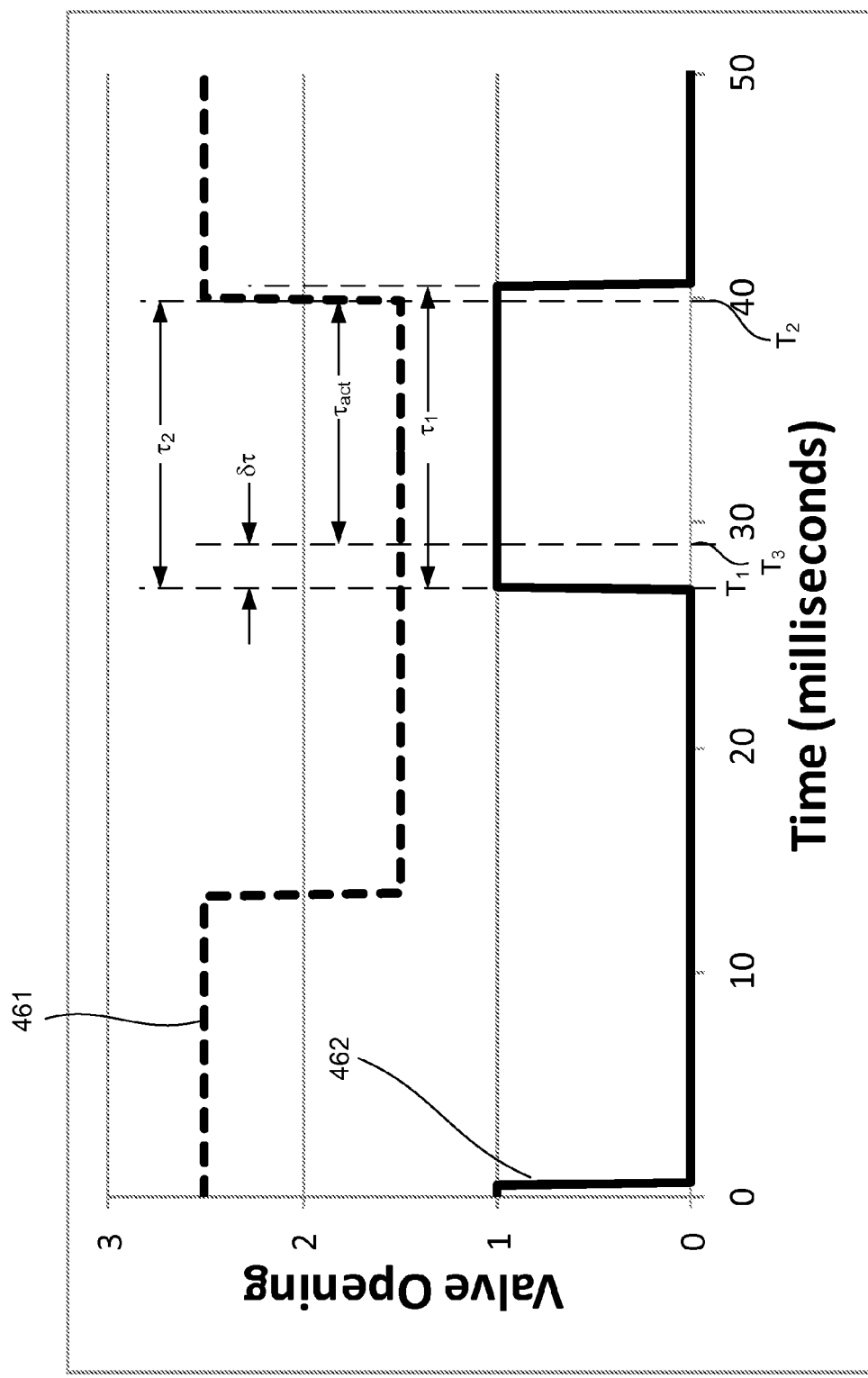
FIG. 4B is a timing diagram of skip fire operation in a low pressure spring mode according to a particular embodiment of the present invention.

This system can operate in either a high pressure spring or low pressure spring mode. Operation in the low pressure spring mode is described below by referring to the example timing diagram shown in FIG. 4B. This figure shows the relative timing of the intake valve opening 461 and the exhaust valve opening 462 over a time period somewhat longer than one working cycle. The engine speed is assumed to be 3000 rpm allowing the horizontal axis to be expressed in units of time, rather than in units of crankshaft degrees as was used in FIG. 1B. The exhaust valve 462 is open for a dwell time $\tau_1$ beginning at a time $T_1$. As discussed earlier a representative exhaust valve opening dwell time, $\tau_1$, may be 13 ms at an engine speed of 3000 rpm. As previously discussed the time required to deactivate the intake valve may be approximately 10 ms, denoted as the deactivation time $\tau_{act}$, in FIG. 4B. If the intake valve opens on the second cycle shown in FIG. 4B it would open at time $T_2$. The decision to open the intake valve must be made prior to $T_3$, where $T_3$ precedes the intake valve opening time by the deactivation time $\tau_{act}$. Prior to the decision to open the intake valve at $T_3$, the system must verify that the exhaust valve has opened. Under normal conditions the exhaust valve opening at $T_1$ would be detected. The ECU 140 monitors the exhaust proximity sensor for a time period around its expected opening at T1. If the opening is verified, the intake valve is enabled to open at T2 (assuming that the cylinder is to be fired). If the exhaust valve motion is not verified, the ECU immediately instructs the intake valve solenoid 234 to activate, deactivating the intake valve and preventing possible mechanical damage. In this example the decision time period, $\delta\tau$, to make the decision to deactivate the intake valve is approximately 3 ms. Note this time must include any time guard bands to compensate for uncertainty in any of the measured system parameters and system response.

Figure 4C:
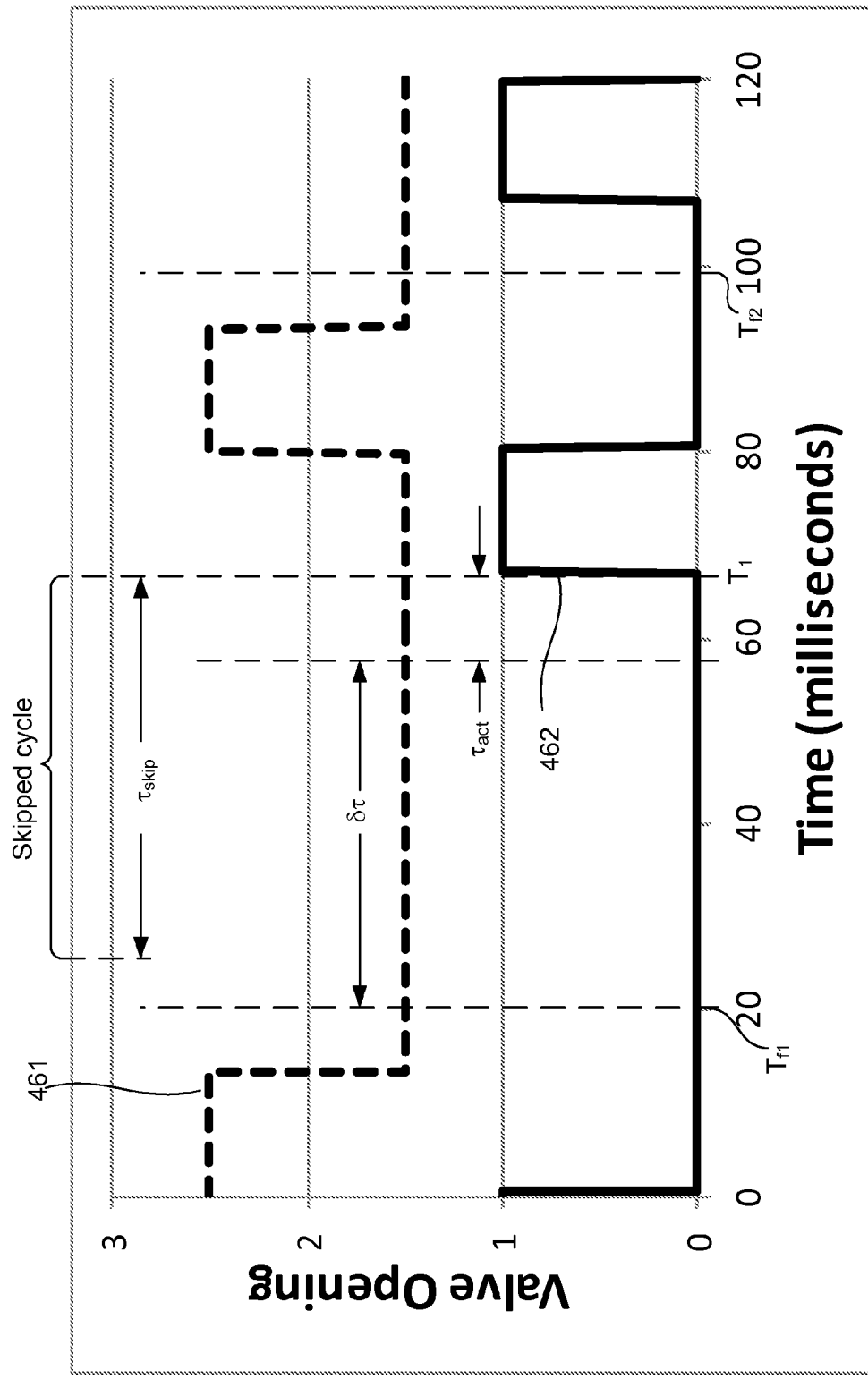
FIG. 4C is a timing diagram of a skip fire operation in a high pressure spring mode according to a particular embodiment of the present invention.

The system can also be operated in a high pressure spring mode. In this case the exhaust valve remains closed after a combustion event and the combustion gases remain trapped in the cylinder. Operation in the high pressure spring mode may be explained with the aid of FIG. 4C, which shows an example timing diagram for this case. In this example a firing event occurs after the closing of the intake valve 461 at a time $T_{f1}$, which corresponds approximately to the end of the compression stroke. Unlike the case shown in FIG. 4B, the exhaust valve 462 remains closed (i.e. deactivated) on the subsequent exhaust opportunity, trapping the high pressure gas in the cylinder. To avoid damage to the intake valve, the next valve to open is the exhaust valve 462 and thus the intake valve 461 remains closed on the following intake opportunity. This corresponds to a skipped working cycle where both the intake and exhaust valves have remained closed. The decision time $\delta\tau$ is much longer in this case, on the order of $\tau_{skip}$, which corresponds to a length of a working cycle or 40 ms in this example. In this example a second firing occurs at a time $T_{f2}$.

An advantage of operating in the high pressure spring mode is that the trapped combustion gasses in the cylinder ensure positive pressure in the cylinder with respect to the crankcase to minimize oil consumption.

A further advantage of reactive embodiments, operating in either the high pressure spring or low pressure spring mode, is that they reduce the number of cycles on the solenoid and collapsible lifter locking mechanism. The collapsible lifter remains in whatever state it was in, activated or deactivated, until it is directed to change by the ECU. This reduces wear on the collapsible lifters and intake and exhaust solenoids and may increase system operating lifetime and reliability.

Figure 5:
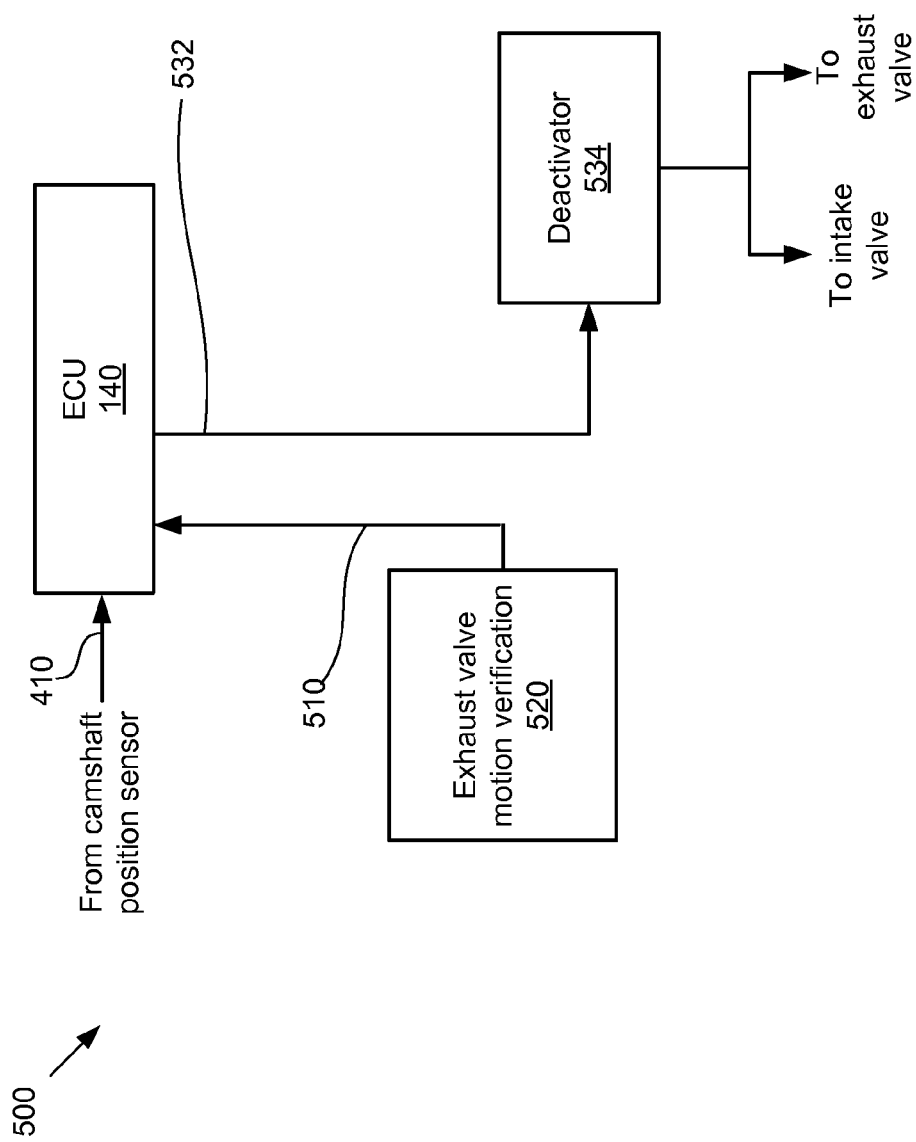
FIG. 5 is a schematic diagram of a valve control system that inhibits opening of an intake valve into a cylinder containing high pressure gas according to a particular embodiment.

Another embodiment of a valve control system 500 is shown in FIG. 5. A key aspect of this embodiment is to achieve cylinder deactivation utilizing a common mechanism, i.e. a single deactivator 534 per cylinder to implement cylinder deactivation. The single deactivator 534 combines the functions of the intake valve solenoid and exhaust valve solenoid described in other embodiments although it may take forms other than a solenoid. Similar to previous embodiments, this embodiment may be used for either high pressure spring or low pressure spring operating modes. Also, it provides safe reactivation avoiding the potential of bent push rods or damaged valve followers which may be caused by trying to open the intake valve against a high pressure cylinder.

An exhaust valve motion verification module 520 is connected to the ECU 140 by exhaust valve monitor line 510. A camshaft position signal 410 is input into the ECU 140. The ECU 140 is connected to a deactivator 534 by an intake/exhaust valve control line 532. The deactivator 534 controls the application of a control signal or actuation signal to both the intake and exhaust valves. For example, the actuation signal could be application of a working fluid from a high pressure fluid reservoir to both an intake valve collapsible lifter and an exhaust valve collapsible lifter. In this embodiment the intake and exhaust valves must be activated or deactivated substantially simultaneously although in some embodiments short time delays, equivalent to phase shifts relative to the crank angle, may be incorporated in the system. In some embodiments, such as those previously described using a collapsible lifter with cam actuated valves, deactivation can only occur when the valve is in a closed state. If an activation signal is applied while the valve is open, it has no effect on the valve motion during that cycle until the lifter returns to the base circle of the cam. With this in mind, individual valve deactivation can be achieved through accurate timing of the deactivator 534. For example, activating the deactivator 534 after the exhaust valve starts to move would result in deactivation of the intake valve only.

A low pressure spring mode deactivation sequence may be triggered by utilizing a signal sent by the exhaust valve monitor line 510 to the ECU 140 to detect the movement of the exhaust valve. The deactivation signal to the solenoid can be initiated immediately after detection of the movement of the exhaust valve. Alternatively, an independent gate control may be used to control the solenoid valve activation. If implemented as an independent gate for the deactivation command to the deactivator 534, it avoids processing delays in the ECU, i.e. the deactivation command output of the ECU would be set up in advance and the exhaust valve monitor line 510 would trigger the deactivator 534. This ensures the cylinder is at low pressure and therefore reactivation is inherently safe, since no high pressure combustion gases are in the cylinder.

Figure 6:
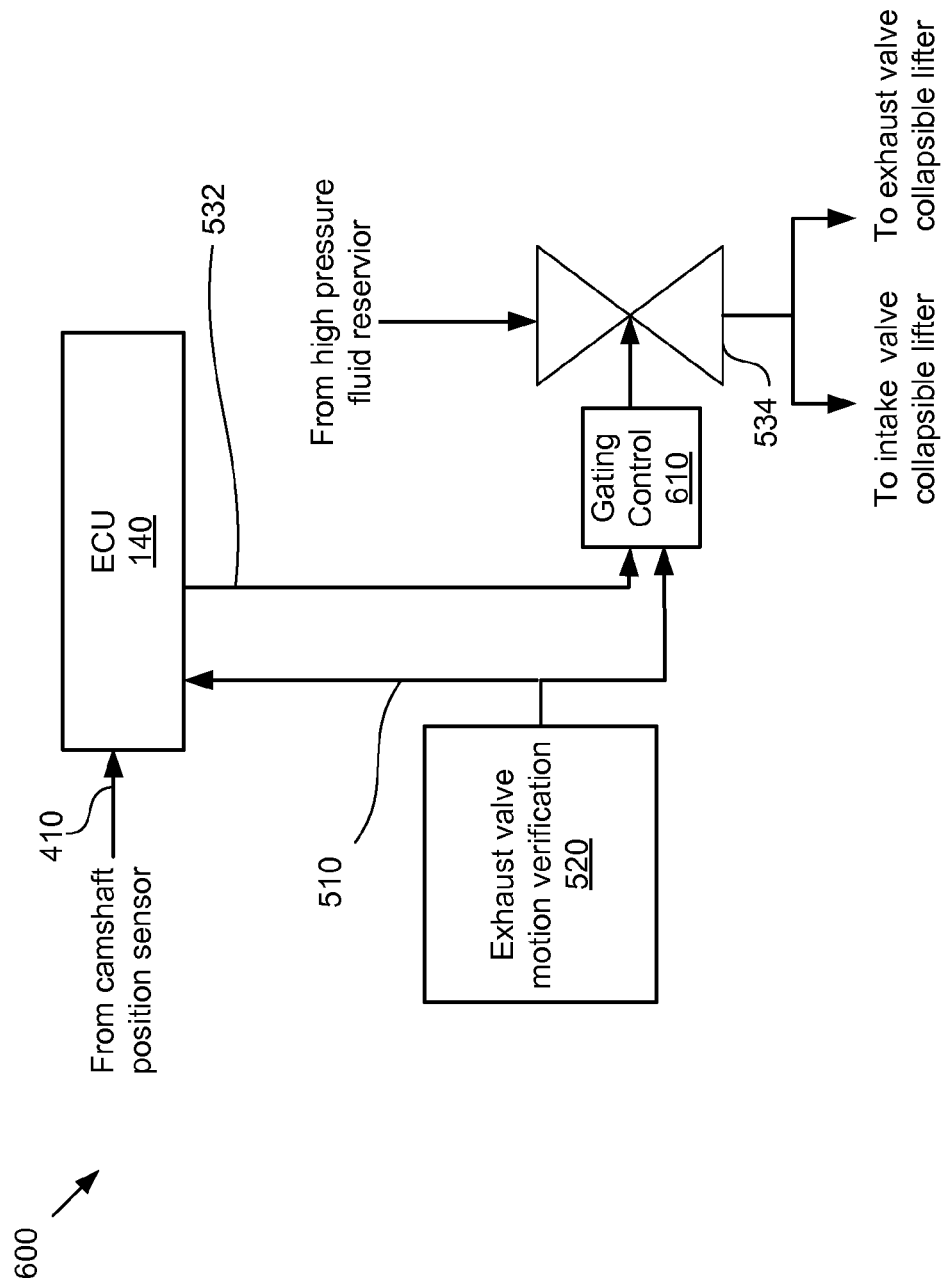
FIG. 6 is a schematic diagram of a valve control system that uses an independent gate control to inhibit opening of an intake valve into a cylinder containing high pressure gas according to a particular embodiment of the present invention.

An embodiment with an independent gate and a single solenoid deactivator is shown in FIG. 6. A gating control 610 is connected to the ECU 140 via the intake/exhaust valve control line 532. The gating control 610 is triggered by the exhaust valve motion verification module 520 via the exhaust valve sensor signal line 510 and drives the single solenoid 534. This helps avoid processing delays in the ECU 140 and helps ensure that the solenoid is triggered at an optimal time. A camshaft position signal 410 is input into the ECU 140 to help define an appropriate timing window for sensing the opening of the exhaust valve and preventing sending of a deactivation at an inappropriate time.

If a deactivation signal on every rotation of the cam is not desired in order to reduce the number of cycles on the solenoid and locking pin, a latching function can be enabled to maintain deactivation. The ECU 140 would reset the state of the latch to facilitate reactivation of the cylinder. This could also be implemented solely through control by a microcontroller or with the latching function implemented by an independent circuit (not shown in FIG. 6). The separate latching circuit implements a fail-safe mode which would protect the intake valve mechanics in the event of a malfunction of the ECU 140.

Alternatively, the single solenoid deactivation can also be achieved without exhaust valve motion verification if the ECU 140 has precise cam angle information. Cam phase is typically sensed by a low resolution (4 pulses per cam rev) sensor. A more accurate encoder may be required in order to avoid excessive conservatism or padding in the triggering of the deactivation pulse.

Advantages of this embodiment are that it provides a lower cost system, since only a single solenoid is required for each cylinder. In some embodiments no exhaust valve motion verification system is required. Also only a single ECU driver circuit is required, because a single solenoid operates both valves. The embodiment also provides for a failsafe reactivation of the intake valve if the system is operating in a low pressure spring mode. Failsafe operation can be realized in the high pressure spring mode by appropriate ECU control latching out deactivation of the solenoid during certain parts of the working cycle.

It should be also appreciated that any suitable operation or process described herein may be stored in a suitable computer readable medium in the form of executable computer code. The operations are carried out when a processor executes the computer code. Such operations include but are not limited to any operations performed by the safety circuit and the ECU.

In some embodiments other types of sensors, either in addition to or in place of proximity sensors, may be used to verify valve motion. Some sensors directly sense motion valve motion or a parameter substantially related to valve motion. For example a pressure switch or transducer may be placed on the oil galley between the solenoid and the collapsible lifter. The switch or transducer may register the decrease in pressure associated with closing the solenoid indicating activation of the valve. This switch or pressure sensor may be incorporated directly into the solenoid to reduce part count and cost. The reluctance of the solenoid coil can also be measured, which indicates whether the solenoid is in an open or closed position. A direct measurement of the in-cylinder pressure may also be used to infer whether the exhaust valve has vented the cylinder. In some embodiments no sensor indicator is required to verify valve operation. The valve operation is assumed to have taken place as directed by the ECU. Thus only appropriate control logic need be implemented in the ECU to ensure that the intake valve does not open into a high pressure cylinder.

In other embodiments valve motion, or lack thereof, may be inferred from measurement of a parameter related to overall engine operation. For example, lifting an exhaust valve loads the camshaft slightly slowing its rotation rate. Thus the change in camshaft rotation speed may be used to verify motion of the exhaust valve. Similarly, the presence of a high pressure exhaust spring, indicative of a closed exhaust valve, loads the crankshaft. Thus the change in crankshaft rotation speed may be used to verify motion of the exhaust valve. In particular comparison of the crankshaft rotation speed, acceleration, and/or jerk during and somewhat after an expected exhaust venting can be used to infer the presence of a high pressure exhaust spring. The impact of a high pressure exhaust spring on crankshaft rotation is greatest somewhat before and after TDC, since the cylinder torque is highest here and thus measurements may focus on these regions of crankshaft angle.

Exhaust combustion gas has different electrical properties than air or an uncombusted fuel/air mixture. Measurement of the electrical properties of the gases within a cylinder may thus be used to determine whether combustion gases have been vented from the cylinder through an open exhaust valve. The sounds or vibrations associated with the opening of the exhaust valve and/or the presence of a high pressure spring may be detected by an engine mounted accelerometer or microphone, such as a knock sensor or similar device. Opening of the exhaust valve may thus be inferred by monitoring an engine mounted accelerometer or microphone. Opening the exhaust valve introduces hot combustion exhaust gases into the exhaust manifold. Opening of the exhaust valve may thus be inferred from a measurement of the exhaust manifold pressure or flow rate. In some cases presence of exhaust gases, and thus an open exhaust valve, may be determined through use of an oxygen sensor in the exhaust system. More detail on these detection methods is given in U.S. Provisional Patent Applications Nos. 61/925,157, 62/002,762, and 61/897,686 and U.S. patent application Ser. No. 14/207,109, each of which is fully incorporated herein by reference.

Additionally, if an intake valve does open against a high pressure exhaust spring, these hot exhaust gases will flow into the intake manifold. This event could be detected using an intake manifold pressure sensor or intake manifold flow rate sensor. While this type of detection may not be useful in cam based systems, it may be useful in systems with faster actuators, such as electro-magnetically actuated valves. Here valve motion could be quickly stopped preventing valve damage.

The relative timing, i.e. where in an engine cycle, each of the above methods detects failure of an exhaust valve to open varies with the method. The earliest inference of exhaust valve motion arises from measurement of signals from the ECU 140 or similar control unit that directs exhaust valve motion. The earliest direct measurement of valve motion is likely by use of a proximity sensor. Depending on the timing of the error signal and the valve deactivation system the safety control systems described herein may be adapted to provide appropriate protection to avoid opening an intake valve into a high pressure spring.

Figure 7:
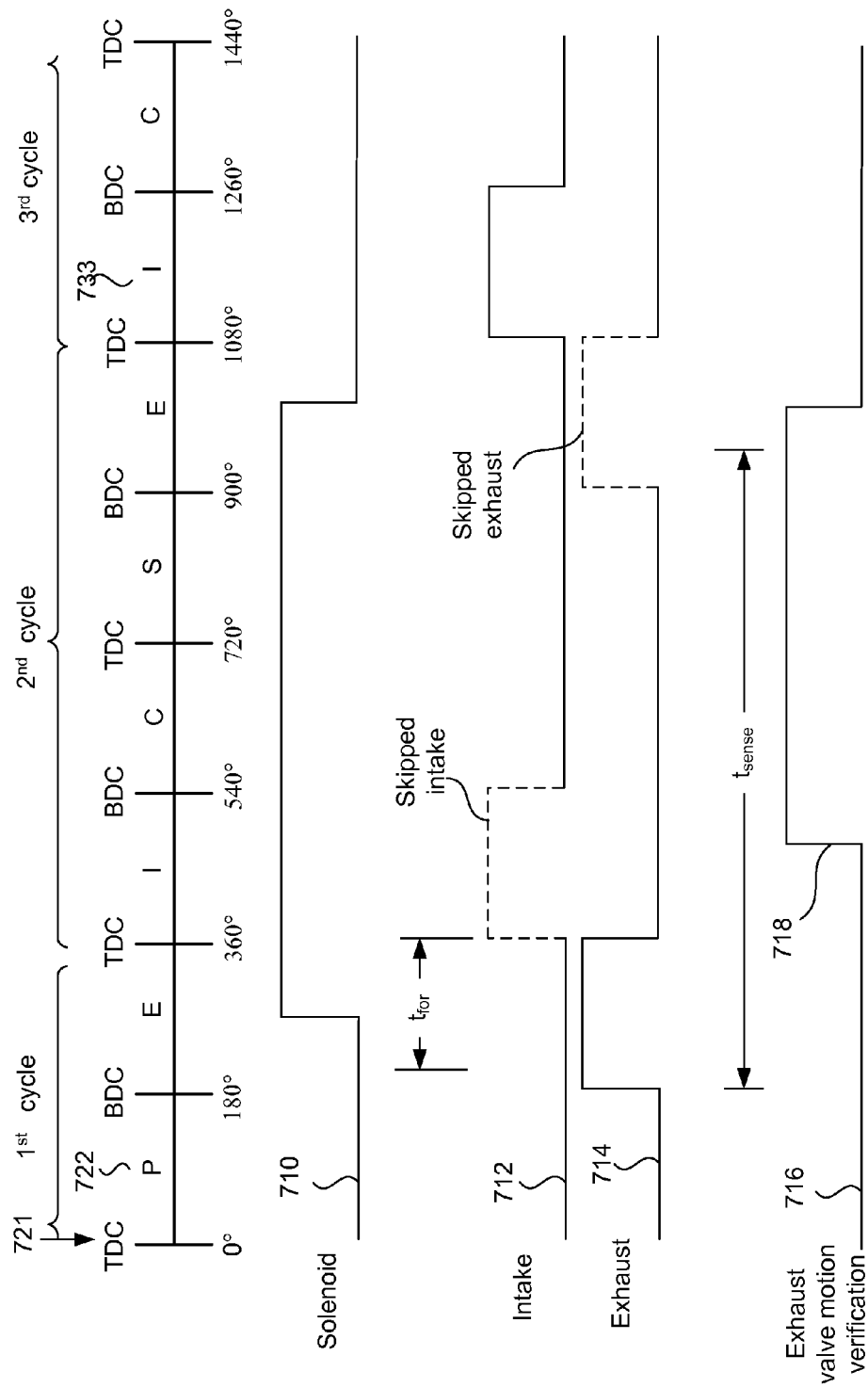
FIG. 7 is a timing diagram according to a particular embodiment of the present invention.

FIG. 7 shows a timing diagram illustrating operation of a representative control system to prevent opening of an intake valve against a high pressure spring. FIG. 7 illustrates operation over 1440° of crankshaft rotation, one complete engine cycle and half of two other cycles. TDC and BDC refer to top dead center and bottom dead center, respectively. The four strokes of the engine are designated as "I" for intake, "E" for exhaust, "C" for compression, and either "P" or "S" depending on whether combustion occurs during the power stroke, "P", or is skipped, "S". Position of a single solenoid valve 710 used to deactivate both the intake and exhaust valves is shown as are the position of the intake valve 712 and exhaust valve 714. For simplicity the intake valve 712 and exhaust valve 714 are shown as open for 90° of crankshaft rotation; however, in practice this is not a requirement. In FIG. 7 a "high" position for traces 710 712, and 714 indicates that the valve is open while a "low" position indicates that the valve is closed. Also shown in FIG. 7 is the exhaust valve motion verification signal 716. When "high" this signal indicates that the exhaust valve has opened and that it is safe to activate the intake valve.

FIG. 7 begins with a fire 721 at approximately 0° produce a power stroke 722 in the interval between 0° and 90° of crankshaft rotation. Both the intake valve 712 and exhaust valve 714 remain closed during this interval. The solenoid valve 710 is also closed, since this engine cycle was active, i.e. the cylinder fired. In this example, the next cycle, cycle 2, is a skipped cycle so the solenoid 710 moves to the high position deactivating the intake valve 712 for cycle 2 (intake valve deactivation is denoted as a dashed line 712). The solenoid 710 remains in the open position until after approximately 900° of crankshaft rotation, where it closes allowing the intake valve 712 to open on the third cycle 733 beginning at 1080° of crankshaft rotation. The exhaust valve motion verification signal 716 begins in a low state and then rises to a high state once it motion of the exhaust valve is detected. As previously described many types of sensors and methods may be used to infer exhaust valve motion. In this example, exhaust valve motion verification signal 716 rises at edge 718 indicating motion of the valve. Depending on the method used to infer exhaust valve motion edge 718 can occur anywhere in the time window tsense. The exhaust valve motion verification signal 716 may be reset low once the solenoid 710 returns to a low position activating the cylinder.

Since in this embodiment there is a single deactivator, damage to the intake valve may be prevented by use of the appropriate timing logic as previously described. Damage to the intake valve can be prevented by ensuring that the exhaust valve opens prior to the intake valve. Control logic can prohibit the solenoid 710 opening in the time window tfor. This window corresponds approximately to the time the exhaust valve is open at the end of fired cycle. If the control logic and all valve actuators are working correctly, prohibiting intake valve activation in this window eliminates the possibility of intake valve damage.

However, it is possible that a fault may occur, so extra control systems can be used to minimize the risk of intake valve damage. One type of fault is that the solenoid 710 valve may not be closed at 0°. In this case the first cycle will most likely not be a fire (i.e. the cylinder was deactivated since the solenoid 710 was high), so no high pressure gases will be trapped in the cylinder and the intake valve will not be damaged even if it opens. Another possible fault is that the exhaust valve fails to open after the fire 721. In this case the intake valve will not be damaged in the second cycle, since the intake valve 712 was deactivated by the solenoid 710. The first possibility of damage to the intake valve 712 will occur in the third cycle, when the solenoid 710 falls to a low position activating the intake valve 712. However, in this case the exhaust valve motion verification signal 716 can be interrogated to verify that exhaust valve motion has occurred. This signal need only arrive by approximately 900° of crank shaft rotation to provide verification of exhaust valve motion. An important aspect of single solenoid operation is that the failure of an exhaust valve to open need not be detected at the beginning of or even concurrently with the exhaust valve opening window. It can occur later in the second cycle, since the intake valve 712 on the second cycle is already deactivated by the solenoid 710. The intake valve 712 can remain in a deactivated state until the exhaust valve motion verification signal 716 rises to a high level, indicating opening of the exhaust valve and venting of the cylinder.

While it is desirable if the solenoid 710 moves low, to activate the valves, in the window between 900° and 1080°, this is not a requirement. As long as solenoid 710 does not move low in the forbidden period, tfor, i.e. in the exhaust stroke immediately after a firing, valve activation will not be harmful. Depending on the timing the exhaust valve 714 may open before the intake valve 712; however, this is not a problem, since the cylinder has already been vented. Opening the exhaust valve 714 to allow gases from the exhaust manifold to flow back into the cylinder is also not a problem.

Although only a few embodiments of the invention have been described in detail, it should be appreciated that the invention may be implemented in many other forms without departing from the spirit or scope of the invention. While the present invention has generally been described using electronically operated solenoids, this is not a requirement. Pneumatic or hydraulically activated solenoids may also be used in place of electronically controlled solenoids. Control logic may be implemented in a pneumatic or hydraulic circuit in place of or in addition to an electronic control circuit. In particular a hydraulically operated shuttle valve may be used, which ensures that an intake valve opening does not follow a firing event without an intervening exhaust event. The valve control system describe herein may be used on only some of the cylinders in an engine. In this case, the remaining cylinders may operate in an always active mode similar to conventional engine control. Disabling the solenoid power supply causes the engine to operate in the conventional mode, reducing cycle count on the deactivation components.

The invention has been primarily described in the context of a skip fire control arrangement in which cylinders are deactivated during skipped working cycles by deactivating both the intake and exhaust valves in order to prevent air from being pumped through the cylinders during skipped working cycles. However, it should be appreciated that some skip fire valve actuation schemes contemplate deactivating only exhaust valves, or only the intake valves to effectively deactivate the cylinders and prevent the pumping of air through the cylinders. Several of the described approaches work equally well in such applications. Further, although it is generally preferable to deactivate cylinders, and thereby prevent the passing of air through the deactivated cylinders during skipped working cycles, there are some specific times when it may be desirable to pass air through a cylinder during a selected skipped working cycle. By way of example, this may be desirable when engine braking is desired and/or for specific emissions equipment related diagnostic or operational requirements. The described valve control approaches work equally well in such applications. Therefore, the present embodiments should be considered illustrative and not restrictive and the invention is not to be limited to the details given herein.

What is claimed is:

1. A method of controlling the operation of an internal combustion engine having at least one cylinder, each cylinder having an associated intake valve and an associated exhaust valve, the method comprising:
   directing skip fire operation of the engine;
   determining whether an exhaust valve actuation failure has occurred in which the exhaust valve associated with a selected cylinder fails to open properly during a selected working cycle during the skip fire operation of the engine; and
   when it is determined that an exhaust valve actuation failure has occurred, deactivating the intake valve associated with the selected cylinder during a subsequent working cycle in which the intake valve would otherwise have been actuated in response to the detection of the exhaust valve actuation failure.

2. A method of controlling the intake valve of an internal combustion engine operating in skip fire mode having at least one cylinder, each cylinder having at least one intake valve and one exhaust valve, the method comprising:
   operating the engine in a skip fire mode having active working cycles and skipped working cycles, wherein during at least some of the skipped working cycle the associated cylinder is deactivated such that air is not pumped through the associated cylinder during the skipped working cycle; and
   during skip fire operation, opening the intake valve associated with each cylinder only after ensuring or verifying that the exhaust valve associated with such cylinder has been opened in a previous working cycle to ensure that the intake valve does not open when the cylinder contains high pressure combustion gases.

3. A method as recited in claim 1 wherein the exhaust valve actuation failure is detected at least in part based on an analysis of at least one of the rotational speed of the crankshaft, angular acceleration of the crankshaft and angular jerk of the crankshaft.

4. A method as recited in claim 1 wherein the exhaust valve actuation failure is detected at least in part based on an analysis of the output of a proximity sensor that senses movement of the exhaust valve.

5. A method as recited in claim 1 wherein the exhaust valve actuation failure is detected at least in part based on an analysis of at least one selected from the group consisting of:
   angular speed, acceleration or jerk of a camshaft that drives the exhaust valve;
   electrical properties of gases within the selected cylinder;
   the output of an accelerometer, microphone or knock sensor that monitors the engine;
   exhaust manifold pressure;
   exhaust flow rate; and
   exhaust gas oxygen content.

6. A method as recited in claim 1 wherein the subsequent working cycle in which the intake valve would otherwise have been actuated is the working cycle that immediately follows the working cycle for which the exhaust valve actuation failure was detected.

7. A method as recited in claim 1 wherein the subsequent working cycle in which the intake valve would otherwise have been actuated is the second working cycle following the working cycle for which the exhaust valve actuation failure was detected.

8. A method as recited in claim 1 wherein the intake valve associated with the selected cylinder is deactivated during each subsequent working cycle in which the intake valve would otherwise open into a cylinder containing high pressure combustion gases.

9. A method as recited in claim 2 wherein the intake valve is deactivated after each intake event and must be reactivated to initiate a subsequent intake event.

10. A method as recited in claim 9 wherein the intake valve is activated for an active working cycle only after an exhaust actuation event has been detected in association with the immediately previous active working cycle in the associated cylinder to help ensure that the intake valve to not open into a cylinder containing high pressure combustion gases.

11. A method as recited in claim 2 wherein the intake valve is affirmatively deactivated after detection of an exhaust valve actuation failure.

12. A method as recited in claim 1 wherein the intake and exhaust valves are deactivated during most skipped working cycles to prevent air from being pumped through the associated cylinders during such skipped working cycles.

13. A valve control system for use in an internal combustion engine operating in skip fire mode, the engine including a plurality of deactivatable cylinders and a camshaft, each cylinder having an associated intake valve and an associated exhaust valve, the camshaft being arranged to actuate the intake and exhaust valves, wherein for each deactivatable cylinder, the valve control system includes:
   a collapsible lifter arranged to activate and deactivate the cylinder by activating and deactivating the intake and exhaust valves associated with the cylinder, the collapsible lifter being hydraulically actuatable;
   a solenoid valve arranged to control the application of a high pressure hydraulic fluid to the collapsible lifter;
   wherein the solenoid valve and collapsible lifter are arranged to allow opening of the intake valve only after opening of the exhaust valve.

14. A valve control system as recited in claim 13 wherein for each deactivatable cylinder, the activation of the cylinder is prohibited during an associated designated portion of an engine cycle.

15. A valve control system as recited in claim 13 further comprising an exhaust valve motion verification module arranged to detect opening of the exhaust valve to vent combustion gases.

16. A valve control system as recited in claim 15 wherein the exhaust valve motion verification module is required to detect opening of the exhaust valve before activation of the intake valve.

17. A valve control system as recited in claim 15 wherein the exhaust valve motion verification module uses crankshaft rotation speed or time derivatives thereof to detect exhaust valve opening.

* * * * *